US012739887B2

(12) United States Patent
Cozzo et al.

(10) Patent No.: US 12,739,887 B2
(45) Date of Patent: Sep. 15, 2026

(54) INITIAL ACCESS WITH MULTIPLE PRACH TRANSMISSIONS

(71) Applicant: Samsung Electronics Co., Ltd., Suwon-si (KR)

(72) Inventors: Carmela Cozzo, San Diego, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 18/344,729

(22) Filed: Jun. 29, 2023

(65) Prior Publication Data

US 2024/0032107 A1 Jan. 25, 2024

Related U.S. Application Data

(60) Provisional application No. 63/456,313, filed on Mar. 31, 2023, provisional application No. 63/444,481,
(Continued)

(51) Int. Cl.
*H04W 74/08* (2024.01)
*H04W 74/00* (2009.01)
*H04W 74/0833* (2024.01)

(52) U.S. Cl.
CPC ..... *H04W 74/0833* (2013.01); *H04W 74/006* (2013.01); *H04W 74/0891* (2013.01)

(58) Field of Classification Search
CPC ........... H04W 74/0833; H04W 74/006; H04W 74/0891; H04W 72/0446; H04W 72/0453; H04W 72/232; H04W 74/004
See application file for complete search history.

(56) References Cited

U.S. PATENT DOCUMENTS

2019/0327766 A1* 10/2019 Zhang .................. H04L 5/0051
2020/0008188 A1* 1/2020 Nam .................. H04W 72/046
(Continued)

FOREIGN PATENT DOCUMENTS

CN 110115092 A * 8/2019 .............. H04L 1/08
WO 2021112999 A1 6/2021
(Continued)

OTHER PUBLICATIONS

International Search Report and Written Opinion issued Oct. 18, 2023 regarding International Application No. PCT/KR2023/010096, 7 pages.
(Continued)

*Primary Examiner* — Wutchung Chu

(57) ABSTRACT

Methods and apparatuses for multiple physical random access channel (PRACH) transmissions in a wireless communication system. A method includes receiving a system information block (SIB) that indicates a first number of multiple PRACH transmissions, a first partition of PRACH occasions (ROs) associated with multiple PRACH transmissions, a second partition of ROs associated with one PRACH transmission, and one or more first sets of multiple ROs associated with the first number of multiple PRACH transmissions. The one or more first sets include ROs from the first partition of ROs but not from the second partition of ROs The method further includes determining a group of ROs from the one or more first sets of multiple ROs, determining a PRACH preamble for transmission in a first number of ROs of the group of ROs, and transmitting the PRACH preamble in the first number of ROs of the group of ROs.

15 Claims, 8 Drawing Sheets

Related U.S. Application Data filed on Feb. 9, 2023, provisional application No. 63/389,313, filed on Jul. 14, 2022.

(56) References Cited

U.S. PATENT DOCUMENTS

2020/0008247 A1* 1/2020 Kwak .................... H04B 7/088
2020/0260497 A1* 8/2020 Ozturk .................. H04W 16/14
2021/0058971 A1* 2/2021 MolavianJazi ..... H04W 56/001
2021/0352697 A1* 11/2021 Irukulapati ........... H04L 5/0048
2021/0360697 A1* 11/2021 Wu ....................... H04L 5/0053
2022/0038935 A1 2/2022 Xiong et al.
2022/0046714 A1* 2/2022 Zhou ................. H04W 74/0833
2022/0046725 A1* 2/2022 Xiong ............... H04W 72/0446
2022/0061099 A1* 2/2022 Sun ................... H04W 74/0891
2022/0070941 A1 3/2022 Farag et al.
2022/0191940 A1 6/2022 MolavianJazi et al.
2022/0210844 A1 6/2022 MolavianJazi et al.
2022/0256589 A1* 8/2022 Sakhnini ............. H04W 74/004
2022/0264659 A1* 8/2022 Enbuske ........... H04W 74/0836
2022/0322256 A1* 10/2022 Cheng ................. H04W 56/001
2022/0394782 A1* 12/2022 Ye ..................... H04W 74/0833
2022/0408491 A1* 12/2022 Liu ....................... H04L 5/0048
2023/0056778 A1* 2/2023 Lin .................. H04W 74/0833
2023/0077869 A1* 3/2023 Ly ....................... H04W 74/006 370/311
2023/0108411 A1* 4/2023 Sakhnini ........... H04W 74/0833 370/329
2023/0171814 A1* 6/2023 Cozzo ............... H04W 74/0833 370/329
2023/0180300 A1* 6/2023 Lin ....................... H04W 48/16 370/329
2023/0189342 A1* 6/2023 Lin ..................... H04W 74/006 370/329
2023/0199859 A1* 6/2023 Li ..................... H04W 74/0833 370/329
2023/0209606 A1* 6/2023 Zhang ................. H04W 74/006 370/329
2023/0254900 A1* 8/2023 Khan .................. H04W 74/004 370/329
2023/0276504 A1* 8/2023 Kim .................. H04W 74/0833 370/329
2023/0284275 A1* 9/2023 Khan .................. H04W 74/006 370/329
2023/0292371 A1* 9/2023 Rune ................. H04W 74/0833
2023/0345549 A1* 10/2023 Elshafie .............. H04L 27/0008
2023/0379963 A1* 11/2023 Lin ....................... H04L 5/0053
2023/0389084 A1* 11/2023 Belleschi ............ H04W 74/002
2023/0403689 A1* 12/2023 He .................... H04W 56/0015
2023/0421338 A1* 12/2023 Li ......................... H04L 5/0094
2024/0080884 A1* 3/2024 Ma ...................... H04W 74/002
2024/0179759 A1* 5/2024 Takahashi ........... H04W 74/006
2024/0251454 A1* 7/2024 Cozzo ............... H04W 74/0833
2024/0259088 A1* 8/2024 Rune .................. H04B 7/18532
2024/0267944 A1* 8/2024 Li ......................... H04W 74/08
2024/0365394 A1* 10/2024 Wu ................... H04W 74/0833
2024/0381444 A1* 11/2024 Han .......................... H04L 5/14
2024/0397556 A1* 11/2024 Mangalvedhe ..... H04W 74/006
2024/0414773 A1* 12/2024 Wang ................ H04W 52/0216
2025/0048420 A1* 2/2025 Ly ..................... H04W 74/0833
2025/0063604 A1* 2/2025 Matsumura ........... H04W 88/02
2025/0142631 A1* 5/2025 Cui ....................... H04W 24/10
2025/0393080 A1* 12/2025 Shibaike ............ H04B 7/06952
2026/0006650 A1* 1/2026 Shibaike ................. H04W 8/22

FOREIGN PATENT DOCUMENTS

WO 2021257951 A1 12/2021
WO 2022021408 A1 2/2022

OTHER PUBLICATIONS

Moderator (ZTE Corporation), "Final feature lead summary on support of Type A PUSCH repetitions for Msg3", 3GPP TSG RAN WG1 #105-e, R1-2106247, May 2021, 84 pages.
Extended European Search Report issued Oct. 14, 2025 regarding Application No. 23840013.9, 11 pages.
Office Action issued Jun. 12, 2026, in connection with Indian Patent Application No. 202517003028, 8 pages.

* cited by examiner

INITIAL ACCESS WITH MULTIPLE PRACH TRANSMISSIONS

CROSS-REFERENCE TO RELATED APPLICATIONS AND CLAIM OF PRIORITY

The present application claims priority to:

U.S. Provisional Patent Application No. 63/389,313, filed on Jul. 14, 2022;

U.S. Provisional Patent Application No. 63/444,481, filed on Feb. 9, 2023; and

U.S. Provisional Patent Application No. 63/456,313, filed on Mar. 31, 2023.

The contents of the above-identified patent documents are incorporated herein by reference.

TECHNICAL FIELD

The present disclosure relates generally to wireless communication systems and, more specifically, the present disclosure relates to an initial access with multiple physical random access channel (PRACH) transmissions in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an initial access with multiple PRACH transmissions in a wireless communication system.

In one embodiment, a user equipment (UE) is provided. The UE includes a transceiver configured to receive a system information block (SIB). The SIB indicates a first number of multiple physical random access channel (PRACH) transmissions, a first partition of PRACH occasions (ROs) associated with multiple PRACH transmissions, a second partition of ROs associated with one PRACH transmission, and one or more first sets of multiple ROs associated with the first number of multiple PRACH transmissions. The one or more first sets include ROs from the first partition of ROs and do not include ROs from the second partition of ROs. The UE further includes a processor operably coupled to the transceiver. The processor is configured to determine a group of ROs from the one or more first sets of multiple ROs and a PRACH preamble for transmission in a first number of ROs of the group of ROs. The transceiver is further configured to transmit the PRACH preamble in the first number of ROs.

In another embodiment, a base station (BS) is provided. The BS includes a transceiver configured to transmit a SIB. The SIB indicates a first number of multiple PRACH receptions, a first partition of ROs associated with multiple PRACH receptions, a second partition of ROs associated with one PRACH reception, and one or more first sets of multiple ROs associated with the first number of multiple PRACH receptions. The one or more first sets include ROs from the first partition of ROs and do not include ROs from the second partition of ROs. The BS further includes a processor operably coupled to the transceiver. The processor is configured to determine a group of ROs from the one or more first sets of multiple ROs and a PRACH preamble for reception in a first number of ROs of the group of ROs. The transceiver is further configured to receive the PRACH preamble in the first number of ROs.

In yet another embodiment, a method is provided. The method includes receiving a SIB that indicates a first number of multiple PRACH transmissions, a first partition of ROs associated with multiple PRACH transmissions, a second partition of ROs associated with one PRACH transmission, and one or more first sets of multiple ROs associated with the first number of multiple PRACH transmissions. The one or more first sets include ROs from the first partition of ROs and do not include ROs from the second partition of ROs The method further includes determining a group of ROs from the one or more first sets of multiple ROs, determining a PRACH preamble for transmission in a first number of ROs of the group of ROs, and transmitting the PRACH preamble in the first number of ROs of the group of ROs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
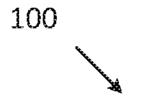
FIG. 1 illustrates an example of wireless network according to embodiments of the present disclosure.
Figure 1:
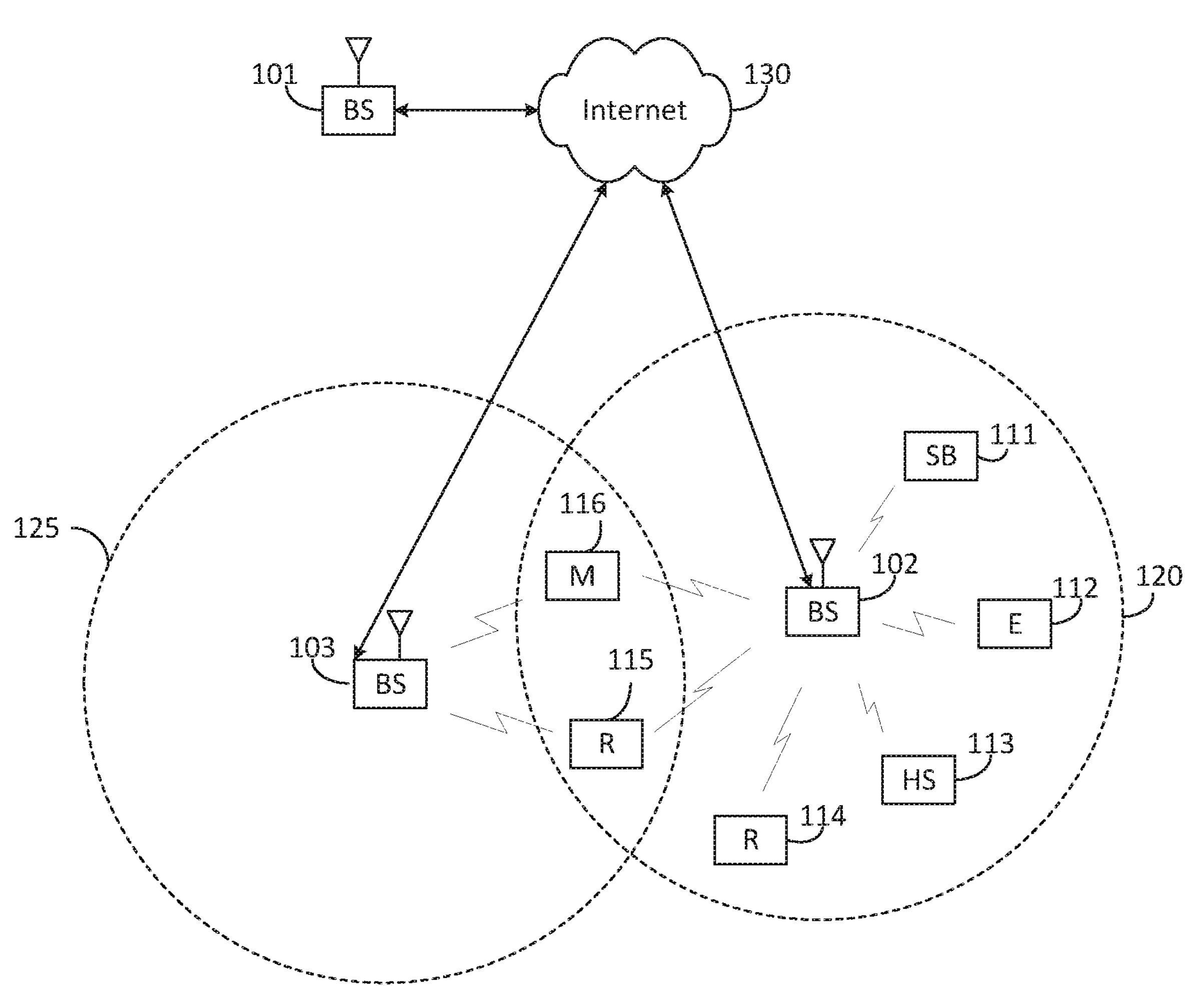
Figure 2:
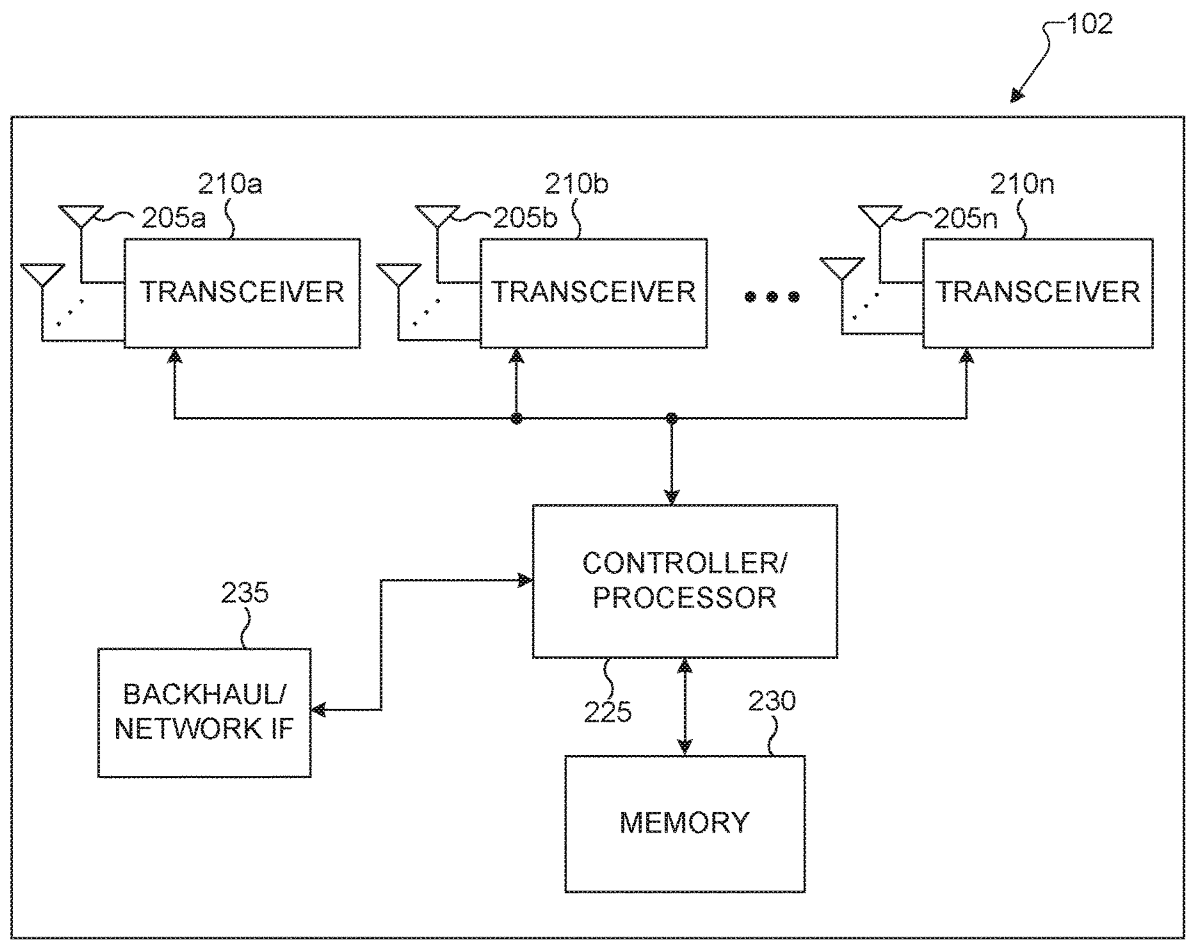
FIG. 2 illustrates an example of gNB according to embodiments of the present disclosure.
Figure 3:
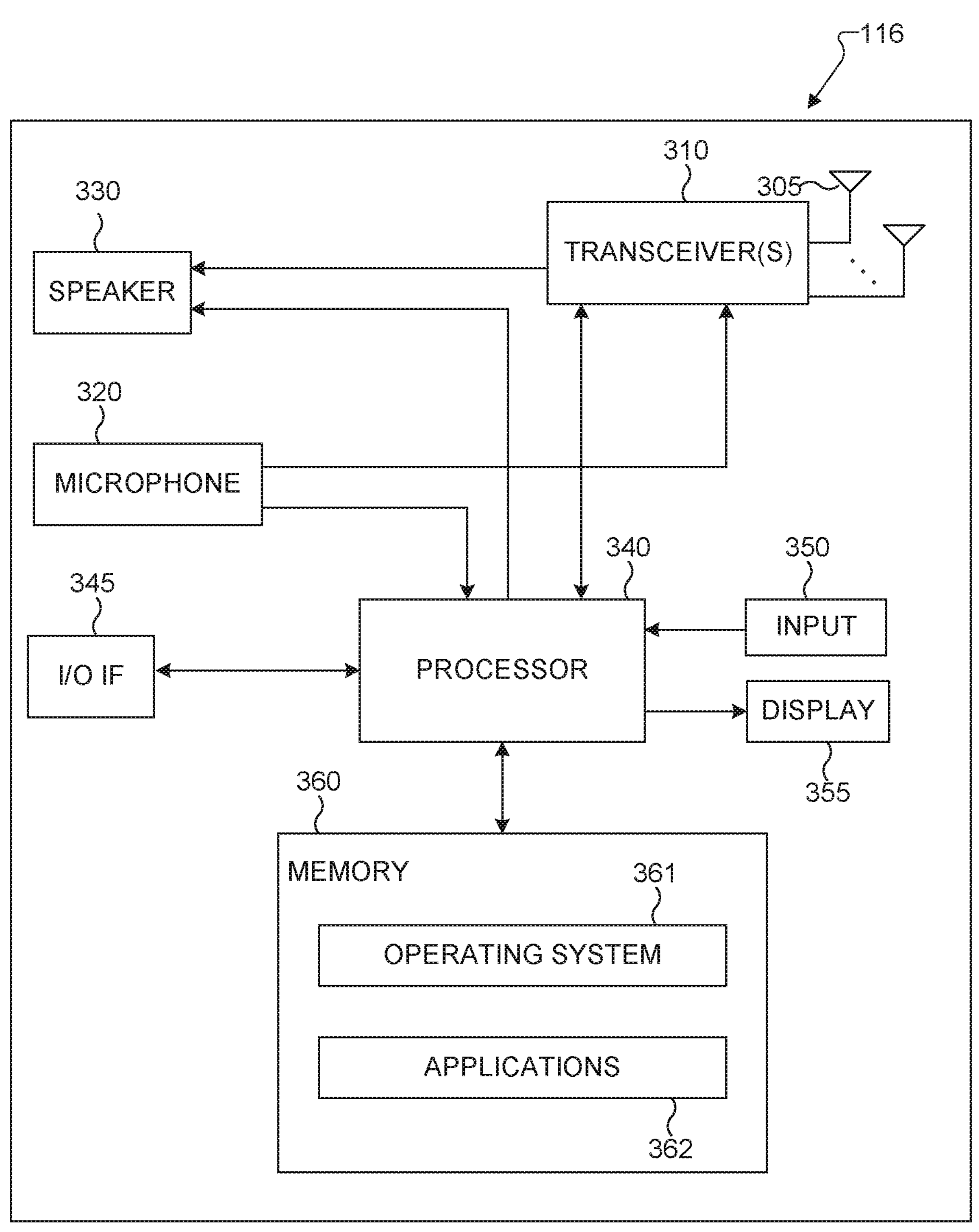
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for supporting an initial access with multiple PRACH transmissions in a wireless communication system. In certain embodiments, and one or more of the gNBs 101-103 includes circuitry, programing, or a combination thereof, for supporting an initial access with multiple PRACH transmissions in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channel signals and the transmission of DL channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225**.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for supporting an initial access with multiple PRACH transmissions in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting an initial access with multiple PRACH transmissions in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
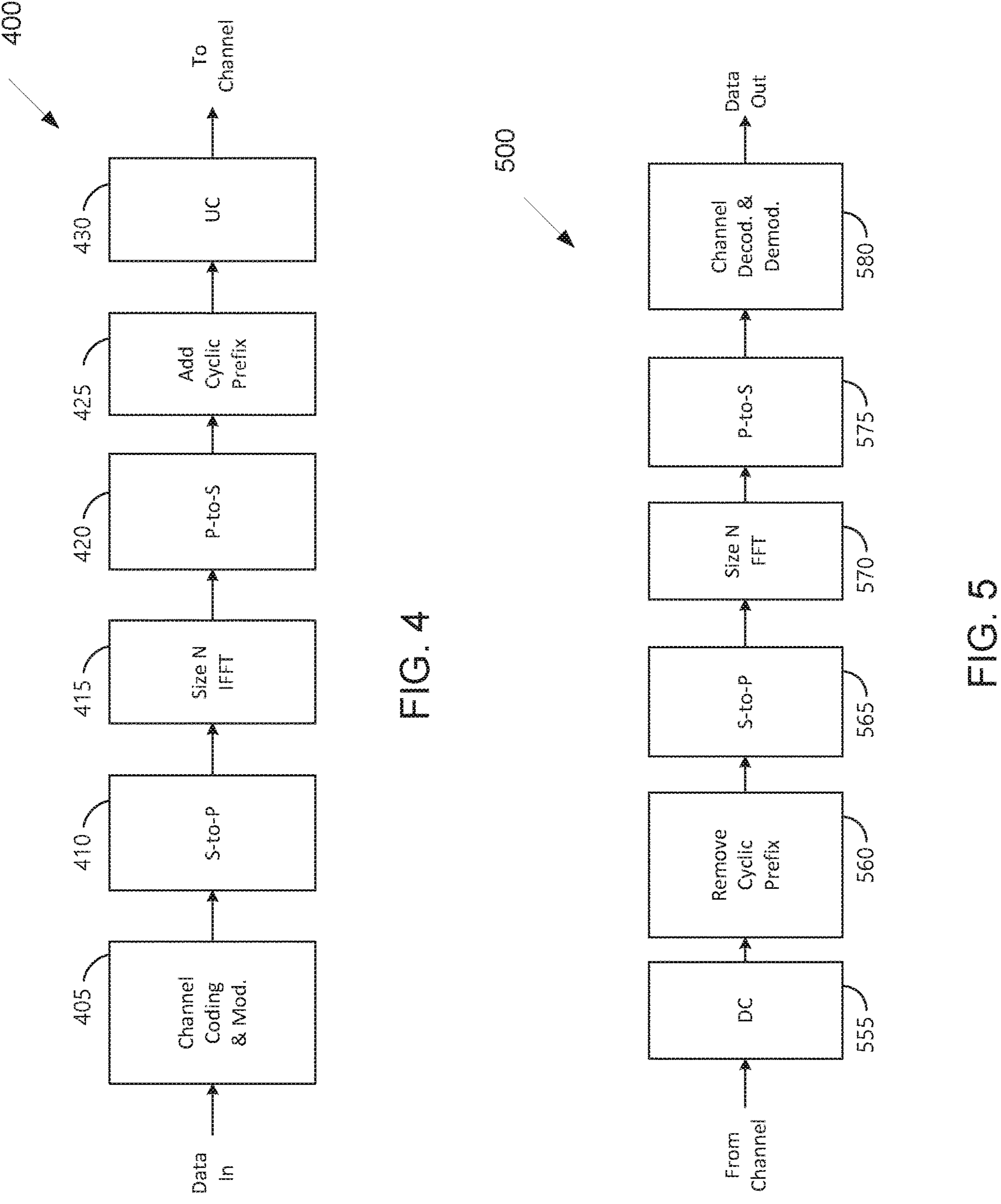
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support an initial access with multiple PRACH transmissions in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure provides that transmission of a PRACH by a UE in poor coverage conditions may not be received successfully by a gNB. A way to improve PRACH reception is for the UE to repeat the PRACH transmission a number of times and for the gNB to combine the corresponding multiple PRACH receptions. In order to enable combining of the multiple PRACH receptions by the gNB, there is a need to provide means for a gNB to determine PRACH receptions associated to a same UE. There is another need to provide signalling mechanisms for the UE to determine PRACH resources for multiple PRACH transmissions.

The present disclosure relates to a random access (RA) procedure for a UE to establish RRC connection with a serving gNB wherein the random access procedure includes multiple PRACH transmissions from the UE. The disclosure relates to determining a number of repetitions for a PRACH transmission. The present disclosure also relates to determining time and frequency resources and PRACH preamble indexes for multiple PRACH transmissions. The disclosure further relates to calculating a RA-RNTI associated with the ROs used for the multiple PRACH transmissions.

Throughout the present disclosure, terms as random access resources, or PRACH resources, or RACH resources are used interchangeably to indicate resources for random access procedure and the resources can be associated with one or more UE features.

Embodiments described in this disclosure for multiple PRACH transmissions with same beam are also applicable to multiple PRACH transmissions with different beams, or vice versa.

A RA procedure can be initiated by radio resource control (RRC) for a system information (SI) request if a system information block 1 (SIB1) includes scheduling information for an on-demand SI request, by a medium access control (MAC), or by a physical downlink control channel (PDCCH) order. The RA procedure can be initiated due to a variety of triggers or purposes.

For example, the RA procedure can be initiated for initial access to establish an RRC connection, where a user equipment (UE) transitions from a RRC_IDLE state to a RRC_CONNECTED state, to re-establish an RRC connection after radio link failure (RLF), for an on-demand SI request, or for hand-over. In addition, the RA procedure can be initiated for purposes such as uplink (UL) synchronization, scheduling request (SR), positioning, or link recovery referred to herein as beam failure recovery (BFR).

The RA can operate in at least two modes. A first mode is contention-based random access (CBRA) where UEs transmitting to a same serving cell can share same RA resources and, accordingly, there is a possibility of collision among RA attempts from different UEs. A second mode is contention-free random access (CFRA) where a UE has dedicated RA resources that are indicated by a serving gNB and may not be shared with other UEs so that RA collisions can be avoided. A four-step RA procedure, also known as a Type-1 (L1) random access procedure, includes a transmission of a physical random access channel (PRACH) preamble (Msg1), an attempt to receive a random access response (RAR or Msg2), a transmission of a contention resolution message (Msg3), and an attempt to receive a contention resolution message (Msg4).

An alternative RA procedure can include only two steps, referred to herein as two-step RACH or a Type-2 L1 random access procedure. In two step RACH, Msg1 and Msg3 are combined into a MsgA transmission and Msg2 and Msg4 above are combined into a MsgB reception. MsgA combines a PRACH preamble transmission in a RACH occasion (RO) along with a PUSCH transmission in a so-called PUSCH occasion (PO). The mapping between ROs and POs can be one-to-one, many-to-one, or one-to-many.

A gNB transmits a SS/PBCH block using a downlink beam in order to cover a corresponding area on a cell. Typically, there is a coverage imbalance between DL receptions and UL transmissions due to imbalance in maximum powers that can be used for respective transmissions by the gNB and by a UE. To compensate for such coverage imbalance, the UE can send multiple PRACH transmissions using a same spatial filter for all PRACH transmissions. The UE can select a received SS/PBCH block based on the quality of the SS/PBCH block reception and transmits a number of PRACH repetitions so that the gNB can combine the corresponding multiple PRACH receptions. The UE can also send multiple PRACH transmissions by sweeping over multiple spatial filters.

For example, the gNB can transmit a number of SS/PBCH blocks using different narrow downlink beams and the UE can transmit multiple PRACHs using different spatial filters associated to the receptions of the different SS/PBCH blocks. A combination of multiple PRACH transmissions with different spatial filters and multiple PRACH transmissions for each of the different spatial settings is also possible. The gNB may be able to detect one or more of the UE transmissions, and based on the configuration of the PRACH transmission, the gNB may transmit one or more RARs to the UE.

If the UE does not receive an RAR, either because the gNB has not detected a PRACH preamble from the UE, for example because a corresponding spatial filter used by the UE does not provide sufficiently large SINR, or because although the gNB has successfully detected the PRACH preamble from the UE and has transmitted an RAR to the UE, the UE has not received the RAR, for example because a corresponding spatial filter used by the gNB does not provide sufficiently large SINR, the UE may restart the RA procedure. If a RAR is successfully received by the UE, the UE transmits a Msg3.

A gNB usually sends multiple SS/PBCH block transmissions where each SS/PBCH block transmission can be associated with an SS/PBCH block index that corresponds to a downlink beam. A mapping between SS/PBCH block index and RACH occasions (ROs) and/or preamble enables the possibility to establish a beam pair, e.g., during initial access. For example, the gNB transmits SS/PBCH block with index i that corresponds to downlink beam i, the UE receives the SS/PBCH block with index i and transmits a PRACH preamble in RO j that is associated with SS/PBCH block with index i. The association between SS/PBCH blocks and ROs and/or PRACH preambles can be a 1-to-1 mapping or a many-to-one mapping or a one-to-many mapping.

Figure 6:
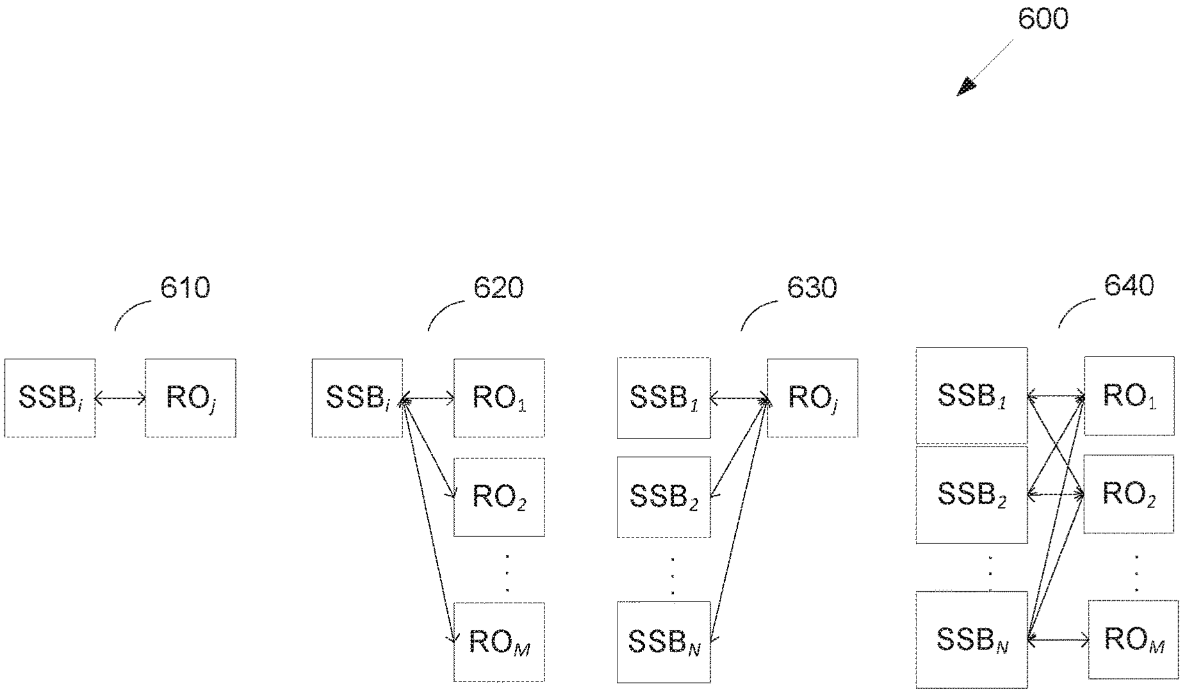
FIG. 6 illustrates an example of mapping between SS/PBCH blocks and ROs according to embodiments of the present disclosure.

FIG. 6 illustrates an example of mapping between SS/PBCH blocks and ROs 600 according to embodiments of the present disclosure. An embodiment of the mapping between SS/PBCH blocks and ROs 600 shown in FIG. 6 is for illustration only.

As illustrated in FIG. 6, in one example the mapping is a 1-to-1 mapping of SS/PBCH block and PRACH occasion 610. The association of the SS/PBCH block index i and the RO j provided by a PRACH configuration allows the gNB to understand the beam where the UE is located so that gNB can transmit a RAR corresponding to the PRACH transmission in RO j by the UE using the downlink beam i where SS/PBCH block with index i was transmitted. Each RO can be associated to a single PRACH preamble or to multiple PRACH preambles, and the configuration provides the number of PRACH preambles associated to one RO.

In one example, the mapping is a 1-to-M mapping of SS/PBCH block and PRACH occasions 620. Each RO of the M ROs corresponds to a single SS/PBCH block index and the transmission in the RO by the UE is an indication of the SS/PBCH block index. Thus, the association of the SS/PBCH block index and the RO provided by a PRACH configuration allows the gNB to understand the beam where the UE is located. Each RO can be associated to a single PRACH preamble or to multiple PRACH preambles, and the configuration provides the number of PRACH preambles associated to one RO.

In one example, the mapping is a N-to-1 mapping of SS/PBCH blocks and PRACH occasion 630. An RO is associated to multiple SS/PBCH indexes and the transmission in the RO by the UE does not indicate a single SS/PBCH index. Thus, the association of the SS/PBCH block index and the RO provided by a PRACH configuration does not allow the gNB to understand in which of the N beams the UE is located. Different SS/PBCH block indexes need to be associated to different sets of PRACH preambles.

In one example, the mapping is a N-to-M mapping of SS/PBCH blocks and PRACH occasions 640. An RO is associated to multiple SS/PBCH indexes and any of the SS/PBCH index can be associated to multiple ROs. Thus, the association of the SS/PBCH block index and the RO provided by a RACH configuration does not allow the gNB to understand in which of the N beams the UE is located. Different SS/PBCH block indexes need to be associated to different sets of PRACH preambles.

In the present disclosure, determining a number of repetitions for a PRACH transmission is provided.

A UE is provided details of a PRACH transmission prior to initiation of the physical random access procedure. Layer 1 receives from higher layers a set of SS/PBCH block indexes (provided, e.g., by ssb-PositionsInBurst in SIB1 or in ServingCellConfigCommon or by NonCellDefiningSSB) that are mapped to valid PRACH occasions. Layer 1 also receives from higher layers a configuration of PRACH transmission parameters including PRACH preamble format, time resources and frequency resources for PRACH transmission, and parameters for determining the root sequences and their cyclic shifts in the PRACH preamble sequence set. The UE is also provided a number N of SS/PBCH block indexes associated with one PRACH occasion and a number R of contention based preambles per SS/PBCH block index per valid PRACH occasion by ssb-perRACH-OccasionAndCB-PreamblesPerSSB. The PRACH configuration can also include at least one parameter p that indicates a number of repetitions for the PRACH transmission.

A UE that is capable of transmitting PRACH with repetitions and is provided a value P of the parameter p can transmit PRACH with P repetitions. Whether the UE transmits the PRACH with no repetitions or with P repetitions can depend on RSRP measurements based on the received SS/PBCH block. Additionally, it can also depend on a configured threshold, e.g., rsrp-ThresholdSSB-r18, which is a L1-RSRP threshold used for determining whether a PRACH transmission associated to an SS/PBCH block index is transmitted with or without repetitions, or generally with a first number of repetitions or with a second number of repetitions.

It is possible that the RSRP threshold used for determining the number of PRACH repetitions is same as the threshold provided by rsrp-ThresholdSSB, which is used for selecting the SS block and corresponding PRACH resource for path-loss estimation and (re)transmission based on SS blocks that satisfy the threshold, or is same as the threshold provided by rsrp-ThresholdMsg3, which is used for determining whether Msg3 repetition is applicable for the random access procedure. In one instance, the configured threshold can be provided by higher layers.

The PRACH configuration may provide more than one value for the number of repetitions, for example (2, 4) or (2, 4, 8) or (2, 3, 4) or (2, 3, 4, 8) and the UE determines the number of repetitions by selecting one of the configured values based on RSRP measurements of the received SS/PBCH block. When the PRACH configuration provides a single value P, based on the RSRP measurements being above a threshold, the UE transmits PRACH with P repetitions, otherwise the UE transmits PRACH without repetitions. When the PRACH configuration provides two values ($P_1$, $P_2$) for PRACH repetitions, based on the RSRP measurements being above a threshold, the UE transmits PRACH with $P_1$ repetitions or with $P_2$ repetitions. When the PRACH configuration provides more than 2 values, the UE can still determine the number of PRACH repetitions based on RSRP measurements and additionally, the UE can be provided with multiple thresholds.

A configuration of number of PRACH repetitions can include the value 1, for example (1, 2, 4) or (1, 2, 4, 8). When the value 1 is the only value provided in the configuration, or all values in the set of values are ones, the PRACH is transmitted without repetitions. The maximum number of repetitions can be larger than 8, for example 12 or 16.

A configuration of number of PRACH repetitions can be cell-specific and provide a number or a set of numbers of repetitions that applies to all SS/PBCH block indexes in the cell. The layer 1 parameter indicating the number of repetitions provided in a PRACH configuration, for example provided in SIB1 or in ServingCellConfigCommon by ssb-PositionsInBurst, or by NonCellDefiningSSB, is defined per cell and is the same for all SS/PBCH block indexes used in that cell. If more than one value of repetitions is configured, wherein one of the values can be 1, the UE may choose different numbers of repetitions for PRACH transmissions that are associated to receptions of different SS/PBCH block indexes. Thus, the configuration for the number of PRACH repetitions is cell-specific and the content of the configuration is same for all SS/PBCH block indexes or equivalently for all beams.

A configuration of number of PRACH repetitions can be cell-specific and provide a number or a set of numbers of repetitions per SS/PBCH block indexes in the cell. The number of repetitions or the set of numbers of repetitions is associated with an SS/PBCH block index or with a set of SS/PBCH block indexes. For each SS/PBCH block reception, the UE can use the configured value of repetitions or one of the configured values in the set of numbers of repetitions that is associated to the SS/PBCH block index. Thus, the configuration for the number of PRACH repetitions is cell-specific and the content of the configuration is per SS/PBCH block index or equivalently per beam.

It is also possible that the number of repetitions is not provided by the PRACH configuration. If not provided, a pre-defined fixed value or set of pre-defined fixed values are used. For example, the pre-defined values can be 1, or 2, or 4, or 8. A value 1 indicates that the PRACH is transmitted without repetitions.

Figure 7:
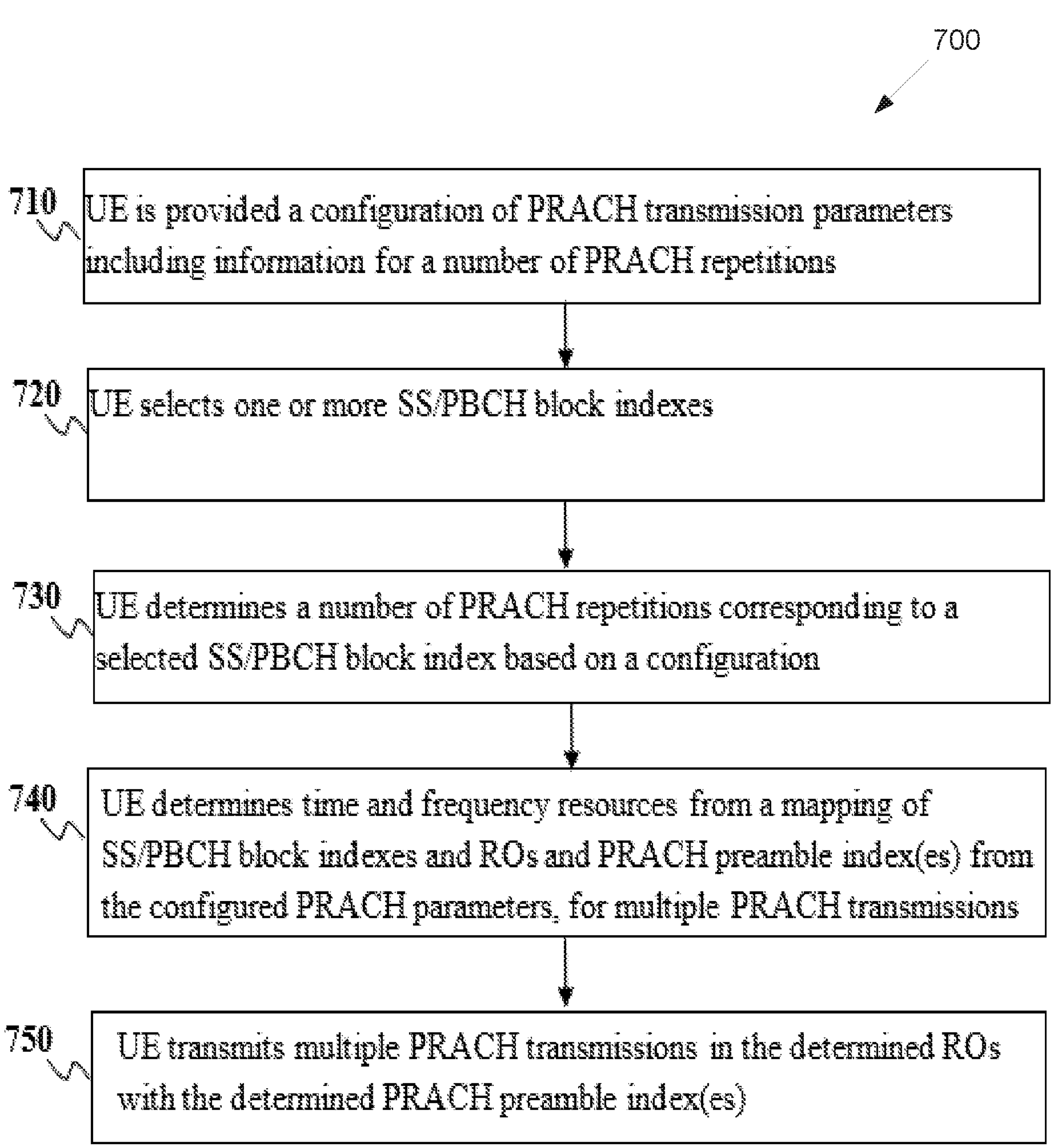
FIG. 7 illustrates a flowchart of UE operation according to embodiments of the present disclosure.

FIG. 7 illustrates a flowchart of UE operation 700 according to embodiments of the present disclosure. The UE operation 700 as may be performed by a UE (e.g., 111-116 as illustrated in FIG. 1). An embodiment of the UE operation 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates an example of a UE determining a number of repetitions for PRACH transmission based on a configuration and on an RSRP measurement according to the disclosure.

A UE is provided a configuration of PRACH transmission parameters including information for a number of PRACH repetitions 710. The UE selects one or more SS/PBCH block indexes (e.g., 720). The UE determines a number of repetitions for PRACH transmission corresponding to a selected SS/PBCH block index based on a configuration (e.g., 730). The UE determines time and frequency resources from a mapping of SS/PBCH block indexes and ROs and PRACH preamble index(es) from the configured PRACH parameters, for multiple PRACH transmissions 740. The UE transmits multiple PRACH transmissions in the determined ROs with the determined PRACH preamble index(es) 750.

In one example, in step 720, the selection can be based on RSRP measurements of SS/PBCH blocks being above a first threshold for SS/PBCH block index selection. Over a time interval, for example a slot or a period, the UE performs RSRP measurements for the received SS/PBCH blocks with indexes indicated in e.g., ssb-PositionsInBurst or NonCell-DefiningSSB, and selects an SS/PBCH block index and associated RO for PRACH transmission. The first threshold value can be provided by a configuration or can be a pre-defined value and can be cell-specific.

In another example, in step 720, at any given time the UE selects the SS/PBCH block index corresponding to the transmitted SS/PBCH block, as indicated in ssb-PositionsIn-Burst or NonCellDefiningSSB (the index corresponding to value 1 in the bitmap) and transmits PRACH in the RO associated with the transmitted SS/PBCH block.

In step 730, additionally or alternatively, the number of repetitions can be based on RSRP measurements of SS/PBCH blocks being above a second threshold for number of PRACH repetitions, wherein the second threshold value can be provided by a configuration or can be a pre defined value and can be cell-specific or associated with the SS/PBCH block index. It is possible that the first threshold for SS/PBCH block index selection and the second threshold for number of PRACH repetitions is the same and provided by a single higher layer parameter. For example, the first threshold for SS/PBCH block index selection is used also for determining the number of repetitions.

In the present disclosure, determining time and frequency resources and PRACH preamble indexes for multiple PRACH transmissions is provided.

A gNB can partition PRACH resources in a cell, and configure one partition for use by UEs that transmit PRACH without repetitions and another partition for use by UEs that transmit PRACH with repetitions, or generally different partitions for different numbers of repetitions. It is possible that resources in one partition can be used for PRACH transmission with repetitions or without repetitions, while resources in another partition can be used only for PRACH transmission with repetitions.

For example, ROs in a first partition can be used for PRACH transmission without repetitions and ROs in a second partition can be used for PRACH transmission with repetitions. In another example, ROs in the first partition can be used for PRACH transmission without repetitions or for transmission of a first PRACH repetition, while ROs in the second partition can be used for PRACH repetitions other than the first PRACH repetition. In yet another example, alternatively or additionally to the partitions of ROs in a cell, PRACH preambles indexes can be partitioned for use with or without PRACH repetitions.

A partition of PRACH resources, for example a partition of ROs, for use with PRACH repetitions can correspond also to a partition used by UEs that support transmitting Msg3 PUSCH with repetitions. Whether the UE transmits the Msg3 PUSCH with repetitions is subject to an indication by the gNB in the RAR UL grant of the number of repetitions. Whether the UE transmits the PRACH with repetitions is subject to an RSRP value estimated by the UE and to one or more threshold values provided by the gNB.

It is possible that a partition of ROs is used by both UEs that transmit multiple PRACHs and by UEs that request to transmit Msg3 PUSCH with repetitions, while the PRACH preambles are shared among UEs that transmit or do not transmit multiple PRACHs and/or request or do not request transmitting Msg3 PUSCH with repetitions. Based on a first threshold, the UE can select PRACH resources from the RACH resource partition common for multiple PRACH transmissions and Msg3 PUSCH transmission with repetitions. Then based on one or more additional thresholds, the UE determines the number of multiple PRACH transmissions if more than one number of PRACH transmissions is possible. If no additional thresholds for determining the number of PRACH transmissions are provided, in one example the UE uses the first threshold to determine the number of multiple PRACH transmissions between two values provided by higher layers, wherein one of the values can be 1, or both values can be 1, or both values can be larger than 1. In another example, the UE uses a pre-determined number for the multiple PRACH transmissions.

It is possible that the first threshold is provided by higher layer parameter rsrp-ThresholdMsg3, and the UE uses the threshold to select PRACH resources from the PRACH resource partition common for multiple PRACH transmissions and Msg3 PUSCH transmission with repetitions. The UE then determines the number of multiple PRACH transmissions based on the same threshold, or equivalently, the UE uses the number of multiple PRACH transmissions associated with the selected RACH resource partition. When the UE is configured with multiple values for the number of multiple PRACH transmissions, the UE can select the first value based on the rsrp-ThresholdMsg3 and if no other thresholds for selection of the number of multiple PRACH transmissions is provided, or can select one of the configured values for the number of multiple PRACH transmissions based on a one or more thresholds if provided.

It is possible that the gNB provides two separate thresholds, for example rsrp-ThresholdPRACH and rsrp-ThresholdMsg3, one for multiple PRACH transmissions and one for Msg3 PUSCH repetitions, and depending on whether separate or common RACH resources can be used for multiple PRACH transmissions and for Msg3 PUSCH with repetitions, the gNB can set the values of the two thresholds to a same or different values, and correspondingly partition the RACH resources in a common partition, partition A, for both multiple PRACH transmissions and Msg3 repetition request, or in two separate partitions, partition B for multiple PRACH transmissions and partition C for Msg3 repetition request. It is also possible that, although two thresholds are provided, the partitions B and C include some resources that are shared resources. For example, ROs in partition B are also in partition C, or vice versa; or PRACH preambles in partition B are also in partition A, or vice versa; or partitions B and C have shared ROs but separate PRACH preambles, or separate ROs and shared PRACH preambles.

It is also possible that a partition of PRACH resources, for example a partition of ROs, for multiple PRACH transmissions can correspond also to a partition according to a UE capability for repetitions of a PUCCH transmission with HARQ-ACK information when dedicated PUCCH resource configuration is not provided (or for repetitions of a PUCCH transmission with HARQ-ACK information or for repetitions of a PUCCH transmission with HARQ-ACK information for reception of a Msg4 PDSCH).

Additionally, the same PRACH resources can correspond to a capability or request to transmit the Msg3 PUSCH with repetitions. Based on a first threshold, wherein the first threshold can be rsrp-ThresholdMsg3 or a separately configured threshold, the UE can select PRACH resources from the PRACH resource partition that is common for multiple PRACH transmissions and for the UE capability for repetitions of a PUCCH transmission with HARQ-ACK information when the UE does not have dedicated PUCCH resources. It is also possible that thresholds for selection of PRACH resource partitions for multiple PRACH transmissions and for PUCCH with repetitions are different, and whether some or all of the PRACH resources, ROs and/or PRACH preambles, are common depends on a gNB configuration of the RACH resources.

Similarly, thresholds for selection of PRACH resource partitions for multiple PRACH transmissions, Msg3 PUSCH with repetitions and PUCCH with repetitions can be separate thresholds, and corresponding PRACH resources can be shared or separate, partially or entirely, for the three features or capabilities. Additionally or alternatively, PRACH resources for multiple PRACH transmissions and/or Msg3 PUSCH with repetitions and/or PUCCH with repetitions when dedicated PUCCH resource configuration is not provided can be also associated to one or more of features including RedCap and/or a specific network slice as group(s) NSAG(s) and/or small data transmission (SDT) and/or Msg3 repetition.

Partitions of PRACH resources for use with or without PRACH repetitions may also depend on the mapping between SS/PBCH block indexes and ROs. For example, when a first partition of ROs is for transmission with repetitions and a second partition is for transmission without repetitions, ROs that are part of the first partition are configured with a 1-to-N mapping of SS/PBCH block and ROs so that a PRACH transmission with $M \leq N$ repetitions uses some or all the N ROs mapped to the same SS/PBCH block. In another example the ROs that are part of the first partition are configured with a 1-to-1 mapping of SS/PBCH block and RO so that a PRACH transmission with M repetitions uses M ROs mapped that are mapped to different SS/PBCH block.

Partitions of PRACH resources for use with or without PRACH repetitions may also depend on whether the gNB transmits a SS/PBCH block with a relatively wide beam in order to cover a corresponding wide area on a cell or with a relatively narrow beam in order to associate different SS/PBCH block transmissions with different downlink beams. When the gNB transmits a SS/PBCH block with a relatively wide beam, the mapping of SS/PBCH block index and ROs can be a 1-to-N mapping so that gNB can successfully detect the PRACH transmission from the one or multiple receptions associated to the same SS/PBCH block index.

When the gNB transmits a SS/PBCH block with a relatively narrow beam, the mapping of SS/PBCH block indexes and ROs can be a 1-to-1 mapping so that the gNB can determine the downlink beam in which the UE is located from the one or multiple receptions associated to the different SS/PBCH block indexes. It is also possible that the mapping for each of the SS/PBCH blocks is a 1-to-N mapping and the UE transmits N PRACH repetitions in the corresponding N ROs associated to one SS/PBCH block. For different SS/PBCH blocks, the number of ROs mapped to one SS/PBCH block can be same or different. Thus, time and frequency resources for multiple PRACH transmissions depend on a mapping between SS/PBCH block indexes and ROs, and on a partitioning of PRACH resources.

In one example, a first RO is associated to a first SS/PBCH block index and a second RO is associated to a second SS/PBCH block index, and first and second ROs can be used either for PRACH transmission without repetitions or for PRACH transmission of a first PRACH repetition. Transmission of PRACH repetitions other than the first repetition can happen in ROs that are configured for PRACH repetitions and are associated to the same SS/PBCH block index as the RO of the first PRACH repetition.

Figure 8:
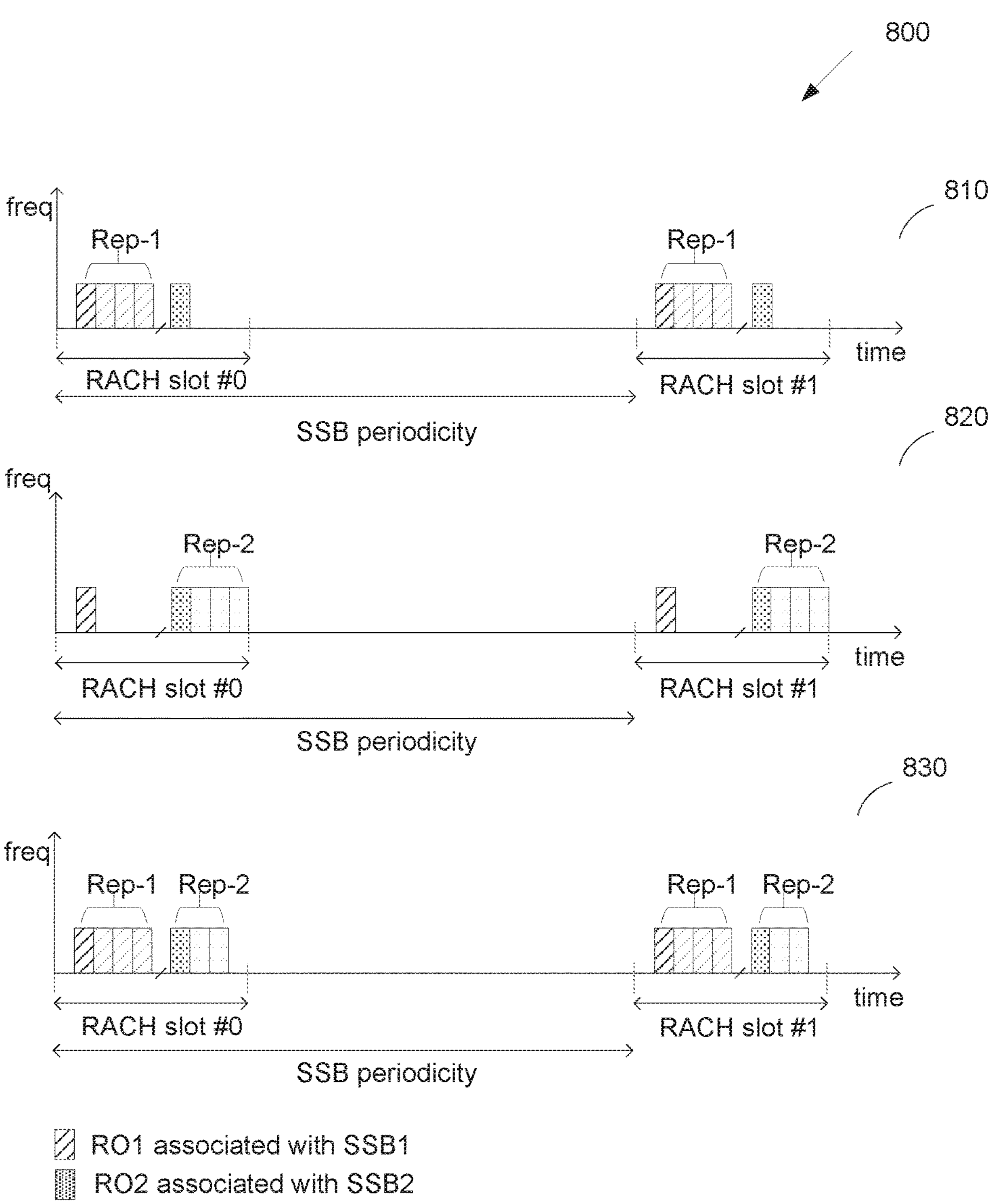
FIGS. 8 and 9 illustrate examples of PRACH transmissions with repetitions according to embodiments of the present disclosure.
Figure 9:
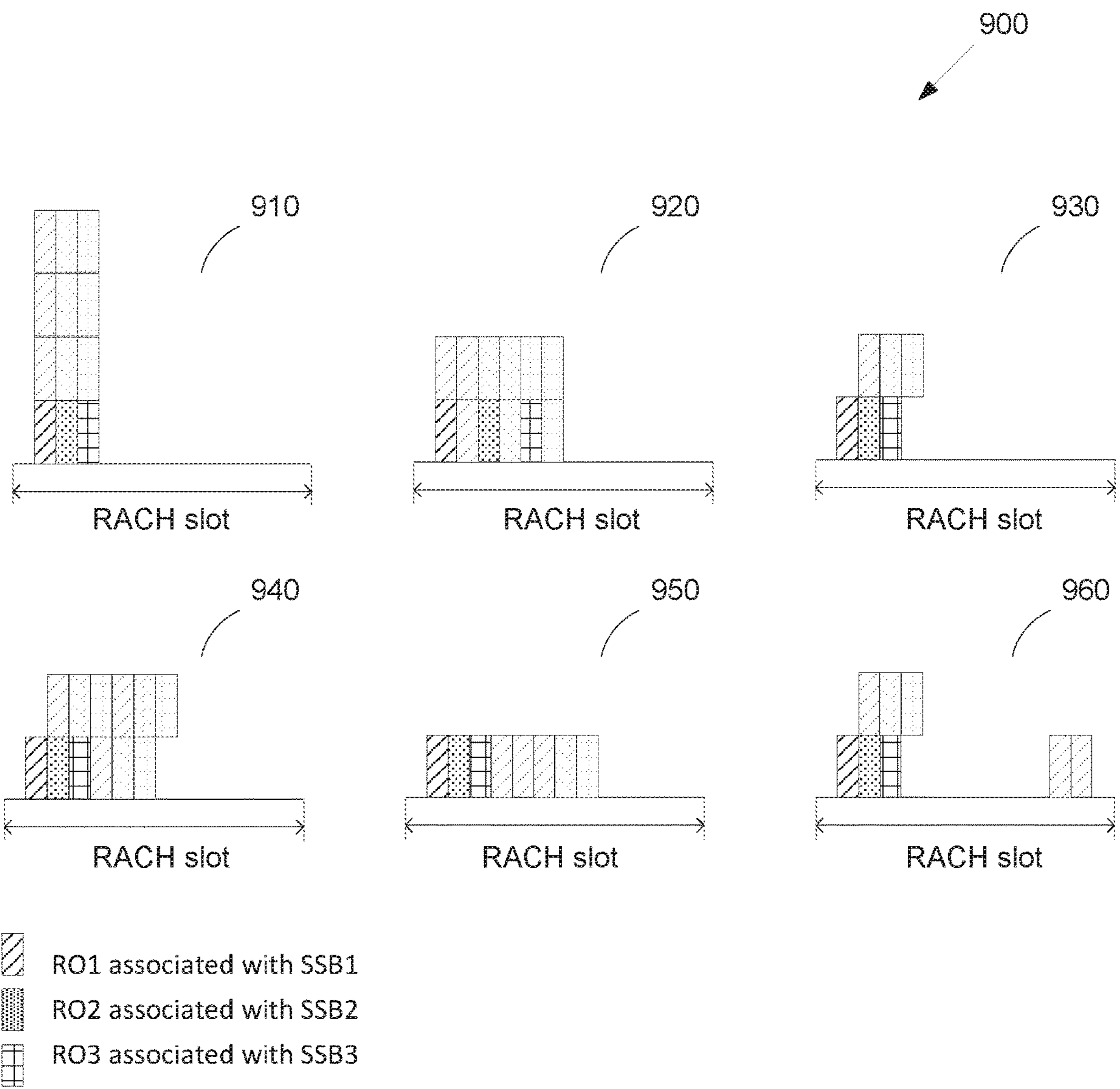

FIGS. 8 and 9 illustrate examples of PRACH transmission with repetitions 800 and 900 according to embodiments of the present disclosure. An embodiment of the PRACH transmission with repetitions 800 and 900 shown in FIGS. 8 and 9 are for illustration only.

FIG. 8 illustrates examples of a PRACH transmission with repetitions that is associated to an SS/PBCH block index and transmitted in ROs with consecutive time resources indexes and same frequency resources, and different mappings of ROs and repetitions in a time period can be associated to same or different SSBs. In 810, the first PRACH transmission associated to the first SS/PBCH block index is with 4 repetitions, wherein the first repetition is transmitted in the first RO associated to the first SS/PBCH block index and second, third and fourth repetitions are transmitted in valid ROs with consecutive time resource indexes and same frequency resources, and the second PRACH transmission associated to the second SS/PBCH block index is without repetitions. In 820, the first PRACH transmission in the first RO is without repetitions, and the PRACH transmission in the second RO is with 4 repetitions and the repetitions are transmitted in valid ROs with consecutive time resources indexes and same frequency resources. In 830, both first and second PRACH transmissions are with repetitions. The first PRACH transmission and the second PRACH transmission in FIG. 8 can refer to the first and the second PRACH attempt.

PRACH repetitions can be transmitted in ROs with subsequent non-consecutive time resources indexes and same frequency resources, or in ROs with subsequent consecutive or non consecutive frequency resources indexes and same time resources, or also in ROs with subsequent time and frequency resources indexes. The periodicity or association period of the mapping of the RO resources and number of repetitions illustrated in FIG. 8 as the SSB periodicity equally apply to any duration of the association period provided to the UE by higher layers.

FIG. 9 illustrates examples of a PRACH transmission with repetitions that is associated to an SS/PBCH block index. RO1, RO2, and RO3 are associated to corresponding SS/PBCH block indexes SS1, SS2 and SS3. RO1, RO2, and RO3 are used to transmit the first repetition of corresponding PRACH1, PRACH2, and PRACH3 transmission with repetitions. ROs used to transmit repetitions of each PRACH transmission are all associated to the same SS/PBCH block index.

As illustrated in FIG. 9, in 910, RO1, RO2, and RO3, or equivalently the ROs in a group or set of ROs, have consecutive time indexes and a same frequency index and for each PRACH transmission the ROs used for transmission of second, third and fourth repetitions have consecutive frequency resources indexes.

In 920, RO1, RO2, and RO3 have non-consecutive time indexes and a same frequency index and for each PRACH transmission the ROs used for transmission of second, third and fourth repetitions have subsequent time and frequency resources indexes.

In 930, RO1, RO2, and RO3 have consecutive time indexes and a same frequency index and ROs for the second repetitions for the corresponding 3 PRACH transmissions are obtained by shifting in time and in frequency the pattern of the ROs used for the first repetitions.

In 940, RO1, RO2, and RO3 have consecutive time indexes and a same frequency index and ROs for subsequent repetitions are obtained by shifting in time and/or in frequency the pattern of the three ROs.

In 950, RO1, RO2, and RO3 have consecutive time indexes and a same frequency index and ROs for subsequent repetitions have subsequent time indexes. PRACH1 transmission is with 4 repetitions, PRACH2 transmission is with 2 repetitions and PRACH3 transmission is with 2 repetitions.

In 960, RO1, RO2, and RO3 have consecutive time indexes and a same frequency index. PRACH1 transmission is with 4 repetitions, PRACH2 transmission is with 2 repetitions and PRACH3 transmission is with 2 repetitions. ROs for the second repetitions for the corresponding 3 PRACH transmissions are obtained by shifting in time and in frequency the pattern of the ROs used for the first repetitions. Additional repetitions of the PRACH1 transmission are shifted in time respect to the first repetition.

In the present disclosure, an indication of time and frequency resource indexes is provided.

An RO used for the first repetition of the PRACH transmission with repetitions can be one of the ROs reserved for transmissions with repetitions or can be one of the ROs that can be used for transmission with or without repetitions. ROs used for repetitions other than the first repetition can be reserved ROs for repetitions.

A UE can be provided an information for ROs that can be used for PRACH repetitions. The information can be provided by an index i that indicates time resources and by an index j that indicates frequency resources, wherein the indexes (i, j) are absolute indexes or are relative indexes respect to the indexes of time and frequency resources of a first PRACH repetition $(i_0,j_0)$.

For example, ROs used for PRACH repetitions are identified by offsets δ and γ as $(i, j)=(i_0+\delta, j_0+\gamma)$, wherein δ and γ have different values for different PRACH repetitions: $(i_1, j_1)=(i_0+\delta_1, j_0+\gamma_1)$ for the second repetition, $(i_2, j_2)=(i_0+\delta_2, j_0+\gamma_2)$ for the third repetition and so on. It is also possible that a single offset δ is used and ROs for repetitions are equally shifted in time and in frequency respect to the RO of the first PRACH transmission. For example, $(i_1, j_1)=(i_0+\delta_1, j_0+\delta_1)$ for the second repetition, $(i_2, j_2)=(i_0+\delta_2, j_0+\delta_2)$ for the third repetition and so on.

In one instance, for 4 PRACH repetitions, the offset refers to the index of the preceding repetition: given δ and γ values, and $(i_0\ j_0)$ as the RO indexes of the first PRACH repetition, for the second repetition $(i_1, j_1)=(i_0+\delta, j_0+\gamma)$, for the third repetition $(i_2, j_2)=(i_1+\delta, j_1+\gamma)$, for the third repetition $(i_3, j_3)=(i_2+\delta, j_2+\gamma)$.

In another instance, for 4 PRACH repetitions, the offset refers to the index of the preceding repetition: given δ and γ=0 values, and $(i_0\ j_0)$ as the RO indexes of the first PRACH repetition, for the second repetition $(i_1, j_1)=(i_0+\delta, j_0)$, for the third repetition $(i_2, j_2)=(i_1+\delta, j_1)$, for the third repetition $(i_3, j_3)=(i_2+\delta, j_2)$. Thus, PRACH repetitions are transmitted in subsequent time resources (or consecutive time resources if δ=1) and same frequency resources. Alternatively or additionally, δ=0. If both offsets have value zero, PRACH repetitions are transmitted using the same RO index and different PRACH preamble indexes.

In yet another instance, for 4 PRACH repetitions, the offset refers to the first repetition: given $\delta=\{\delta_1, \delta_2, \delta_3,\}$ and $\gamma=\{\gamma_1, \gamma_2, \gamma_3\}$ values, and $(i_0,j_0)$ as the RO indexes of the first PRACH repetition, for the second repetition $(i_1, j_1)=(i_0+\delta_1, j_0+\gamma_1)$, for the third repetition $(i_2,j_2)=(i_0+\delta_2, j_0+\gamma_2)$, for the third repetition $(i_3, j_3)=(i_0+\delta_3,j_0+\gamma_3)$.

The offset values can be determined based on a configuration by higher layer, or on pre-defined fixed values. If both configured values and pre-defined values are provided, configured values are used. If both are not provided, the default values for ($\delta$, $\gamma$) can be (1,0), or (0,1) or (1,1).

In the present disclosure, a determination of PRACH preambles for PRACH repetitions is provided.

When repetitions of a PRACH transmission are transmitted in ROs mapped to a same SS/PBCH block index, the same PRACH preamble can be used for all repetitions. Alternatively, the UE can use different PRACH preambles for different repetitions, or same preamble for some of the repetitions and a different preamble for some other repetitions.

It is possible that repetitions of a PRACH transmission are transmitted using a single RO that is associated to an SS/PBCH block index and different PRACH preambles for each repetition.

In the present disclosure, a determination of RA-RNTI for PRACH transmission with repetitions is provided.

A gNB can detect several PRACH preambles from a UE that transmits PRACH with repetitions using multiple ROs, and transmit a RAR. The UE attempts to detect a DCI format with CRC scrambled by a corresponding RA-RNTI during a window controlled by higher layers, wherein the RA-RNTI is a function of parameters related to the PRACH transmission, such as the time and frequency of an RO used for the PRACH transmission, and can be determined by the UE.

For PRACH transmission in a single RO, the RA-RNTI associated with the RO corresponding to the RAR, is calculated as: RA-RNTI=1+s_id+14×t_id+14×80×f_id+14×80×8×μl_carrier_id where s_id is the index of the first OFDM symbol of the PRACH occasion ($0 \le s\_id < 14$), t_id is the index of the first slot of the PRACH occasion in a system frame ($0 \le t\_id < 80$), where the subcarrier spacing (SCS) to determine t_id is based on the value of SCS configuration $\mu$, f_id is the index of the PRACH occasion in the frequency domain ($0 \le f\_id < 8$), and ul_carrier_id is the UL carrier used for PRACH preamble transmission.

For multiple PRACH transmissions, the calculation of the RA-RNTI needs to take into consideration time resources and frequency resources of the ROs used for the multiple PRACH transmission and whether the ROs occupy consecutive or non-consecutive time and/or frequency resources.

In one example, the PRACH transmission with N_t repetitions occupies N_t ROs in consecutive time resources and same frequency resources. The RA-RNTI associated with the ROs used for the multiple PRACH transmissions is calculated as RA-RNTI=1+s_id+14×t_id+14×(N_t−1)+14×80×f_id+14×80×8×ul_carrier_id where the term 14×(N_t−1), or alternatively j×(N_t−1) with $j \ge 1$, accounts for the multiple ROs in time domain. For the PRACH transmission of N_t repetitions, or generally for the PRACH transmission of multiple N_t PRACHs in the N_t ROs, for each of the repetitions or of the transmissions, i=1, . . . , N_t, a corresponding RA-RNTI can be calculated, and the PRACH transmission can be associated with one RA-RNTI corresponding to one index i, or to multiple RA-RNTIs associated to multiple indexes, including the case of N_t RA-RNTIs. It is possible that the RA-RNTI is associated with one RA-RNTI corresponding to the first index i=1, or the second index i=2, or the last index i=N_t.

It is also possible that two RA-RNTIs are associated with the first and second indexes, or with the first and last, or more than two RA-RNTIs are associated with more than two indexes. The UE uses the one or multiple RA-RNTIs to receive a RAR message in one or multiple RAR windows.

In another example, the PRACH transmission with N_f repetitions occupies N_f ROs in consecutive frequency resources and same time resources. The RA-RNTI associated with the ROs used for the multiple PRACH transmissions is calculated as RA-RNTI=1+s_id+14×t_id+14×80×f_id+14×80×(N_f−1)+14×80×8×ul_carrier_id, where the term 14×80×(N_f−1), or alternatively j×(N_f−1) with $j \ge 1$, accounts for the multiple ROs in frequency domain. For the PRACH transmission of N_f repetitions, or generally for the PRACH transmission of multiple N_f PRACHs in the N_f ROs, for each of the repetitions or of the transmissions, i=1, . . . , N_f, a corresponding RA-RNTI can be calculated, and the PRACH transmission can be associated with one RA-RNTI corresponding to one index i, or to multiple RA-RNTIs associated to multiple indexes, including the case of N_f RA-RNTIs. It is possible that the RA-RNTI is associated with one RA-RNTI corresponding to the first index i=1, or the second index i=2, or the last index i=N_f. It is also possible that two RA-RNTI are associated with the first and second indexes, or with the first and last, or more than two RA-RNTIs are associated with more than two indexes. The UE uses the one or multiple RA-RNTIs to receive a RAR message in one or multiple RAR windows.

For multiple PRACH transmissions in N ROs that occupy nt consecutive ROs in time domain and nf consecutive ROs in frequency domain, the RA-RNTI associated with the ROs used for the multiple PRACH transmissions is calculated as RA-RNTI=1+s_id+14×(t_id+nt)+14×80×(f_id+nf)+14×80×8×ul_carrier_id.

If the ROs used for the multiple PRACH transmissions are not consecutive in time domain and/or in frequency domain, nt indicates the number of consecutive ROs in time domain from the RO used for the first repetition and including the RO with the largest time index, and nf indicates the number of consecutive ROs in frequency domain from the RO used for the first repetition and including the RO with the largest frequency index. Thus, for a PRACH transmission with N repetitions or for N PRACH transmissions, wherein the N repetitions or the multiple N PRACH transmissions can be transmitted using a same beam or more than one different beams and a same PRACH preamble or more than one different PRACH preambles, in N ROs, or equivalently in a group of ROs, wherein the ROs can occupy same or different time resources and same or different frequency resources, the RA-RNTI can be associated with any RO of the group of ROs and correspondingly can be calculated using time and frequency resource indexes associated with the ROs.

The RA-RNTI can be associated with one RO of the group of ROs and correspondingly can be calculated using time and frequency resource indexes associated with the RO, or the RA-RNTI can be associated with more than one ROs of the group of ROs and correspondingly can be calculated using time and frequency resource indexes associated with the more than one ROs, wherein the time or frequency indexes associated with the one or more ROs can be same or different. When one RA-RNTI is associated with the group of ROs, wherein the one RA-RNTI is calculated using the indexes of time and frequency resources associated with the first RO, or with any of the ROs of the group, the UE attempts to detect a DCI format with CRC scrambled by the one RA-RNTI during a RAR window.

When more than one RA-RNTIs are associated with the group of ROs, wherein the more than one RA-RNTIs are calculated using the indexes of time and frequency resources associated with corresponding multiple ROs, the UE attempts to detect a DCI format with CRC scrambled by a first RA-RNTI during a first RAR window, a DCI format with CRC scrambled by a second RA-RNTI during a second RAR window, and so on. It is possible that the UE attempts to detect more than one DCI formats scrambled by corresponding more than one RA-RNTIs during a same RAR window.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to receive a system information block (SIB) including (i) information associated with random access resources, (ii) at least one reference signal received power (RSRP) threshold, and (iii) information on random access response (RAR) window, wherein the random access resources include first random access resources associated with physical random access channel (PRACH) repetitions; and a processor operably coupled to the transceiver, the processor configured to:

determine, among at least one number for the PRACH repetitions, a number of the PRACH repetitions based on the at least one RSRP threshold and an RSRP measurement of a downlink reference signal, wherein the at least one RSRP threshold corresponds to the at least one number, and determine random access resources for the determined number of PRACH repetitions among the first random access resources, wherein the determined random access resources are associated with a synchronization signal and physical broadcast channel (SS/PBCH) block index of a received SS/PBCH block, wherein the transceiver is further configured to perform PRACH transmission for the number of PRACH repetitions based on the determined random access resources, wherein the processor is further configured to monitor a downlink control information (DCI) format 1_0 on a physical downlink control channel (PDCCH) while the RAR window is running, wherein a cyclic redundancy check (CRC) of the DCI format 1_0 is scrambled by a random access radio network temporary identifier (RA-RNTI), wherein the RA-RNTI is associated with a last random access resource in the determined random access resources, wherein the determined random access resources are consecutive in time and correspond to same frequency resources, and wherein the SS/PBCH block index is associated with a PRACH preamble for the PRACH repetitions.

2. The UE of claim 1, wherein the random access resources further include second random access resources that are not associated with the PRACH repetitions.

3. The UE of claim 1, wherein the SIB further includes the at least one number for the PRACH repetitions.

4. The UE of claim 1, wherein each of the at least one number the PRACH repetitions is one of 2, 4 or 8.

5. The UE of claim 1, wherein the RA-RNTI is calculated based on at least one parameter corresponding to the last random access resource.

6. A base station (BS) comprising:

a transceiver configured to:

transmit a system information block (SIB) including (i) information associated with random access resources, (ii) at least one reference signal received power (RSRP) threshold, and (iii) information on random access response (RAR) window, wherein the random access resources include first random access resources associated with physical random access channel (PRACH) repetitions, receive PRACH transmission for a number of PRACH repetitions based on random access resources among the first random access resources, and transmit a downlink control information (DCI) format 1_0 on a physical downlink control channel (PDCCH) while the RAR window is running; and a processor operably coupled to the transceiver, wherein the number of PRACH preamble repetitions is based on the at least one RSRP threshold and an RSRP measurement of a downlink reference signal, wherein the at least one RSRP threshold corresponds to at least one number for the PRACH repetitions, wherein the random access resources are for the number of PRACH repetitions and associated with a synchronization signal and physical broadcast channel (SS/PBCH) block index of a transmitted SS/PBCH block, wherein a cyclic redundancy check (CRC) of the DCI format 1_0 is scrambled by a random access radio network temporary identifier (RA-RNTI), and wherein the RA-RNTI is associated with a last random access resource in the random access resources.

7. The BS of claim 6, wherein the random access resources further include second random access resources that are not associated with the PRACH repetitions.

8. The BS of claim 6, wherein the SIB further includes the at least one number for the PRACH repetitions.

9. The BS of claim 6, wherein each of the at least one number the PRACH repetitions is one of 2, 4 or 8.

10. The BS of claim 6, wherein the RA-RNTI is calculated based on at least one parameter corresponding to the last random access resource.

11. A method comprising:

receiving a system information block (SIB) including (i) information associated with random access resources, (ii) at least one reference signal received power (RSRP) threshold, and (iii) information on random access response (RAR) window, wherein the random access resources include first random access resources associated with physical random access channel (PRACH) repetitions;

determining, among at least one number for the PRACH repetitions, a number of the PRACH repetitions based on the at least one RSRP threshold and an RSRP measurement of a downlink reference signal, wherein the at least one RSRP threshold corresponds to the at least one number;

determining random access resources for the determined number of PRACH repetitions among the first random access resources, wherein the determined random access resources are associated with a synchronization signal and physical broadcast channel (SS/PBCH) block index of a received SS/PBCH block; and performing PRACH transmission for the number of PRACH repetitions based on the determined random access resources; and monitoring a downlink control information (DCI) format 1_0 on a physical downlink control channel (PDCCH) while the RAR window is running, wherein a cyclic redundancy check (CRC) of the DCI format 1_0 is scrambled by a random access radio network temporary identifier (RA-RNTI), wherein the RA-RNTI is associated with a last random access resource in the determined random access resources, wherein the determined random access resources are consecutive in time and correspond to same frequency resources, wherein the SS/PBCH block index is associated with a PRACH preamble for the PRACH repetitions, wherein the determined random access resources are consecutive in time and correspond to same frequency resources, and wherein the SS/PBCH block index is associated with a PRACH preamble for the PRACH repetitions.

12. The method of claim 11, wherein the random access resources further include second random access resources that are not associated with the PRACH repetitions.

13. The method of claim 11, wherein the SIB further includes the at least one number for the PRACH repetitions.

14. The method of claim 11, wherein each of the at least one number the PRACH repetitions is one of 2, 4 or 8.

15. The method of claim 11, wherein the RA-RNTI is calculated based on at least one parameter corresponding to the last random access resource.

* * * * *